April 9, 1963
L. W. WATTS ETAL
3,084,595
FRAME FOR EYEGLASSES
Filed Jan. 11, 1960
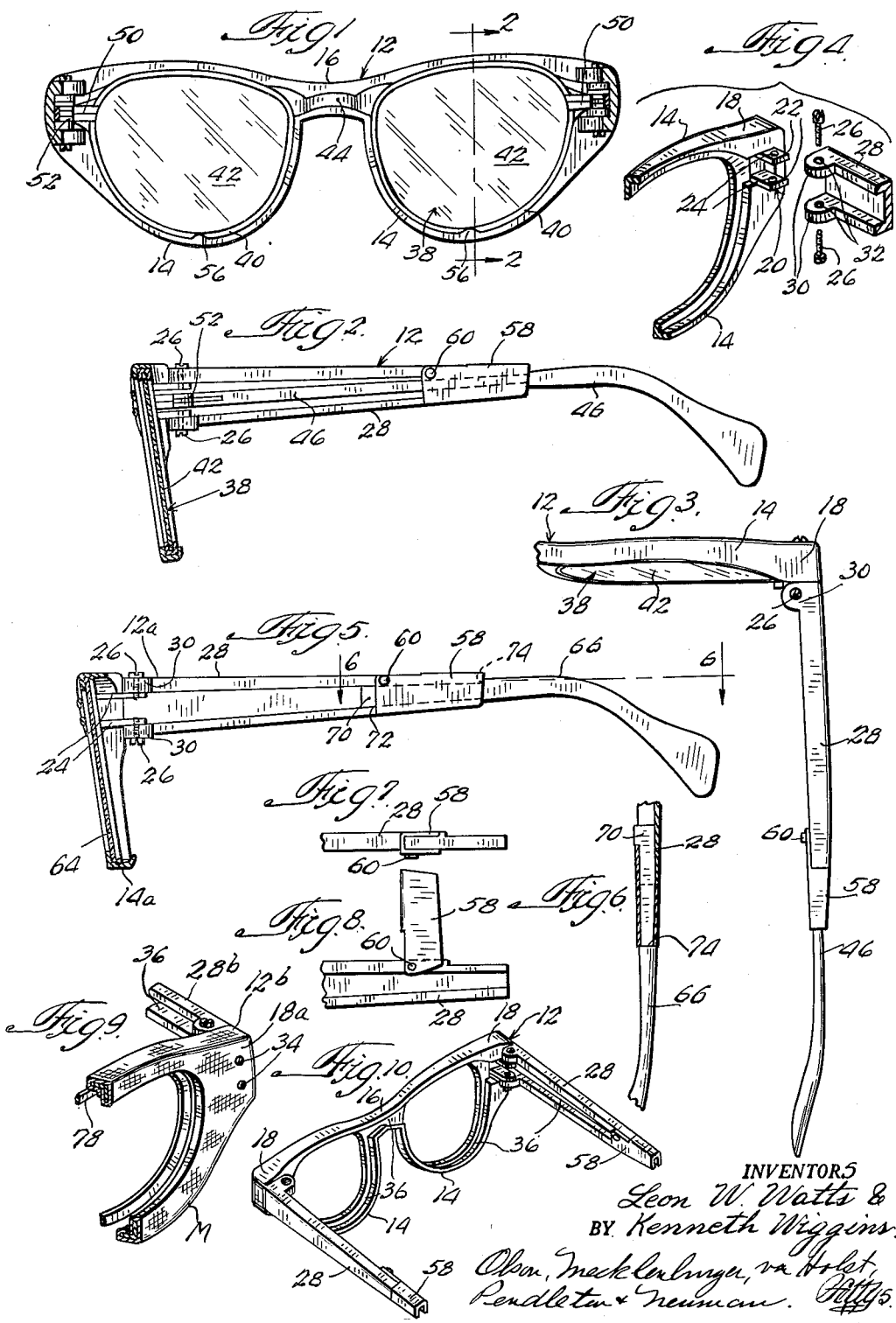
INVENTORS
Leon W. Watts &
BY Kenneth Wiggins
Olson, Mecklenburger, von Holst,
Pendleton & Neuman.

United States Patent Office 3,084,595
Patented Apr. 9, 1963

3,084,595
FRAME FOR EYEGLASSES
Leon W. Watts, 1424 E. 65th Place, and Kenneth Wiggins, 9425 S. Vernon Ave., both of Chicago, Ill.
Filed Jan. 11, 1960, Ser. No. 1,486
6 Claims. (Cl. 88—41)

This invention relates to a novel detachable frame for eyeglasses and more particularly relates to a frame construction adapted for ready attachment to an ordinary pair of eyeglasses so that the appearance thereof may be enhanced.

Eyeglasses which were once considered a detriment to personal appearance, today are so improved in design and style that they oftentimes function to improve the appearance of a person wearing the same. The improved styles and designs serve to both minimize irregularities in the physical features and at the same time accentuate the attractive features possessed by the wearer. Eyeglasses are no longer recognized as a disfiguring necessity, but are considered today by the majority of purchasers as an article of apparel which should be purchased with care and discretion.

Inasmuch as the wearing apparel of an individual is changed with the activity undertaken, so also should the appearance of eyeglasses worn on the face of the wearer change in appearance to be more suitable for a particular occasion. Obviously, dress clothes are not worn for lounging about the house, nor are lounging clothes worn to formal functions. So, also should "dress" eyeglasses and "business" eyeglasses be included in the wardrobe of a well-dressed person.

Heretofore the only manner in which a desired variety of eyeglasses could be obtained was by purchasing a number of pairs of glasses in which the frame and lens were unitary. Obviously, such purchases are quite costly and wasteful. Although certain devices comprising attachments to eyeglasses are known in the art, these devices are difficult to assemble and do not change the entire appearance of the eyeglasses in the manner quite often desired by the wearer.

It is an object of this invention, therefore, to provide a detachable frame adapted for ready assembly with an ordinary pair of eyeglasses which changes the entire appearance of such eyeglasses.

It is another object of this invention to provide a detachable frame for eyeglasses which is inexpensive to manufacture because of its simple construction and accordingly is not subject to easy breakage. Because of the low cost of the frames of this invention, it is intended that they be purchased in desired numbers to serve various occasions by simply attaching a desired frame to a basic pair of eyeglasses.

It is a further object of this invention to provide a frame attachment for eyeglasses which may serve independently of or in conjunction with the eyeglasses as sunglasses or a sunglass attachment.

It is another object of this invention to provide a frame attachment for eyeglasses which may be readily assembled with a number of different eyeglasses of the same basic design.

It is a still further object of this invention to provide a novel detachable frame for eyeglasses which when assembled to the eyeglasses reinforces the entire eyeglass structure against breakage.

The above and other objects of this invention will become more apparent from an examination of the following detailed description when read in the light of the accompanying drawing and appended claims.

In one embodiment of this invention an integral frame assembly adapted for engagement with a pair of eyeglasses is provided. The frame which is preferably of plastic comprises spaced rims joined by a connecting nosepiece or bridge. Temples are hingedly connected to projecting ears mounted in opposed endpieces or lateral projections of the frame rims. The inwardly facing surfaces of the frame rims, bridge and temples are recessed to snugly receive the corresponding parts of a pair of eyeglasses. The frame temples may terminate short of an ear-engaging piece and have pivotal latch members mounted on the terminal end portions thereof for locking purposes, as will hereinafter be made more apparent.

The foregoing construction may be readily assembled to such eyeglasses with which employed and the resulting assembly will function as an integral assembly as will hereinafter be explained in greater detail.

For more complete understanding of this invention reference will now be made to the drawing wherein:

FIGURE 1 comprises an elevational view partly in section of one embodiment of the eyeglass frame of this invention illustrated in assembled relationship with the lens holder and bridge portions of an ordinary pair of eyeglasses;

FIG. 2 is a sectional view of the assembly of FIG. 1 taken along line 2—2 of FIG. 1 and in which the temple pieces of both the eyeglasses and the eyeglass frame are fully illustrated in elevation;

FIG. 3 is a fragmentary top plan view of a pair of eyeglasses assembled with a frame provided by this invention;

FIG. 4 is an exploded view illustrating the hinge connection between the temple piece and the rim endpiece of the frame provided by this invention;

FIG. 5 is a sectional view partly in elevation of a modified eyeglass frame provided by this invention;

FIG. 6 is a fragmentary sectional view taken along line 6—6 of FIG. 5;

FIG. 7 is a fragmentary top plan view illustrating a latch member of one temple piece provided in the eyeglass frame of this invention in a raised position;

FIG. 8 is a side elevational view of the latch and temple fragment illustrated in FIG. 7;

FIG. 9 is a fragmentary perspective view of a modified frame construction utilizing a cloth covering and locking clip member; and, FIG. 10 is a perspective view of one embodiment of the eyeglass frame provided by this invention.

Referring now to the drawing and more particularly to FIG. 10 a frame 12 for a pair of eyeglasses of ordinary construction is illustrated. The frame 12 may be fabricated of plastic, metal, wood or any other material possessing the desired properties which will hereinafter become apparent. The frame 12 employs no lens members and comprises spaced rims 14 joined by a connecting nosepiece or bridge 16. Mounted on opposed projecting endpieces 18 of the rims 14 are C-shaped mounting members 20, one of which is more clearly seen in the exploded view of FIG. 4. Each C-shaped member 20 comprises opposed inwardly projecting ears 22, each of which has a tapped aperture formed therein.

Referring more particularly to FIG. 4, it will be noted that the ears 22 serve as mounting bases for screws 26 which retain temples 28 in pivotal relationship with the frame endpieces 18. As will be seen from FIG. 4, the end limits of the temples 28 hingedly mounted on the frame rims 14 in the normal position of assembly have built-up vertically aligned terminal pieces 30, each of which has an aperture 32 disposed therethrough. In the normal course of rim endpiece-temple assembly, the apertured temple end portions 30 are arranged with the apertures 32 aligned over and beneath the apertures of the two inwardly projecting ears 22, after which the screw members 26 pass through apertures 32 and threadedly engage the tapped apertures 24 of the ears 22.

It is apparent from the foregoing description and from FIGS. 5 and 10 of the drawing that following the assembly of the temple-endpiece frame components an interval will remain between the opposed projecting ears 22. It will also be noted that the projecting, spaced ears 22 may be formed integrally with the rim-endpiece portion similarly to the manner in which the built-up end portions 30 are formed integrally with temples 28. Also, temples 28 may employ a C-shaped member similar to member 20 instead of the built-up end portions 30. Such a C-shaped member would have an interval between its projecting ear members sufficient to straddle the ears 22 of the C-shaped member 20 in the manner above described.

It will be seen from FIG. 9 that members 20 are secured to rim-endpieces 18 by means of screw members 34, although rivets or other equivalent means may be employed for this purpose. It is intended from the foregoing discussion that it be recognized that the hinged connection between the frame rim-endpiece and the temples of the frame 12 be such as to provide an interval between the hinged portions corresponding to the interval between the projecting ears 22 regardless of the specific elements which are employed for purposes of providing the hinged connection.

The interiorly facing surfaces of the rims, bridge and temple members of the provided frame 12 disposed toward the face of the wearer are all recessed in the manner most clearly seen in FIG. 10 so as to provide a continuous channel 36 which is adapted to snugly receive in interlocking engagement the bridge, eyewires and temple portions of an ordinary pair of eyeglasses. The rims are recessed about their inner peripheries while the bridge and temples are recessed in substantially the central portions thereof.

FIGS. 1 and 2 illustrate the frame 12 of this invention in interlocking relationship with portions of a pair of eyeglasses 38. Eyeglasses 38 comprise eyewires or lens holders 40, in which are mounted lenses 42. The spaced lens holders are connected by means of eyeglass bridge 44. As will be more clearly seen from FIG. 2, temples 46 of the eyeglasses 38 are hingedly mounted to endpieces 50 of the eyeglasses at connections 52. As noted in FIGS. 1 and 2 the axes about which temples 28 of frame 12 rotate and the axes about which temples 46 of eyeglasses 38 rotate are collinear. Accordingly, in the assembled condition, the temples 28 of the frame 12 and the temples 46 of eyeglasses 38 will rotate as a unit with no relative movement taking place therebetween. Although, the nature of the snug fit whereby the eyeglasses 38 are received in the channel 36 of the frame member may be such as to dispense with the need for any locking means, it may be desirable to employ means such as projections 56 formed integrally with the bottom rim portions of the frame 12 to securely lock the eyeglass lens holders within the rim channel portions 36 formed in the frame 12. A further clocking means may comprise pivotal latch member 58 clearly shown in FIGS. 2, 5, 7 and 8. Latches 58, which are pivotally mounted on end portions of the frame temples 28 by means of pins 60 lockingly retain temples 46 of eyeglasses 38 to the frame 12 after they have been received in channel portions 36 of the frame temples 28.

In the normal course of assembling an ordinary pair of eyeglasses, such as illustrated eyeglasses 38, to one embodiment of the invention provided, such as frame member 12, all that need be done is to insert the bottom portions of the lens holders of eyeglasses 38 behind projections 56 and into relieved portion 36 of the frame rims 14. The eyeglass bridge 44 is simultaneously urged into the portion of channel 36, formed in the frame bridge 16. Following this latter operation, the hinged connection 52 of the eyeglasses 38 will be in vertical alignment with the hinged connections between temples 28 and ears 22 of the frame 12. The temples 46 of the eyeglasses are next urged into recessed portions 36 formed in the frame temples 28 with the latches 58 in the raised position of FIG. 8, after which the latches are lowered into the locking position illustrated in FIG. 2.

It may be desirable to employ a frame such as frame 12a of FIG. 5 which has mounted therein tinted lenses 64, which serve to shield the eyes of the wearer from the rays of the sun. The modification 12a illustrated in FIG. 5 is of precisely the same construction as frame 12 of FIG. 10 with the exception that the rims 14a of the modified frame are thicker, as illustrated to provide for the tinted lens 64, in addition to reception of the lens holders and lenses of a regular pair of eyeglasses which would normally be received in the rimmed portions 14a in the manner illustrated in FIG. 2.

If it is desired to employ modified form 12a as sunglasses without the use of a discrete pair of eyeglasses, ear-engaging pieces 66 may be attached to each end portion of the frame temples 28. As will be more clearly seen from FIG. 6, the proximal end portion of each ear-engaging piece 66 has an inwardly projecting enlargement 70 formed thereon, which is adapted to engage an edge portion 72 of the pivotal latch member 58 in the manner illustrated in FIG. 5, so as to prevent disengagement of the ear-engaging piece 66 from the temple portion 28 of the sunglasses 12a. Enlargement 70 prevents outward movement of the earpiece 66 and built-up portions 74 seen in FIGS. 5 and 6 prevent inward movement of the ear-engaging pieces relative to the frame temples 28. It is seen from the foregoing description, therefore, that the modified frame 12a of FIG. 5 may be employed as a sunglass attachment for a pair of eyeglasses, such as eyeglasses 38 illustrated in FIGS. 1 and 2, or frame 12a may be employed with the ear-engaging attachments 66 as a pair of sunglasses without the use of eyeglasses.

In FIG. 9, a fragment of a frame member 12b is illustrated wherein the endpiece 18a and the temple 28b are covered with material M. The material after being folded over the surface of the various portions of the frame is gathered in the rear of the frame and the free ends locked in place by means of spring clips 78, such as illustrated in FIG. 9, and similar spring members insertable in the grooves 36 of the temples 28b of the modified form 12b. Utilizing the construction of FIG. 9 a woman who purchases material for making a dress may cover the surfaces of the frame components in the manner illustrated in 12b from a small piece of scrap material and lock the free ends of the material to the various frame components by means of spring members 78 and other equivalent members which will be frictionally maintained in the recesses 36 of the temple and bridge portions.

A novel frame construction has thus been provided which may be readily attached to an ordinary pair of eyeglasses in a rapid and facile manner by inserting portions of the eyeglasses into recesses formed in corresponding portions of the frame members. Obviously, the frame members above described will not be adaptable for engagement with all eyeglasses. It is intended that the eyeglasses and frame members for use therewith be sold as a set. Thus, for a particular pair of eyeglasses a person would also buy a number of frame attachments of different color, hue and shape, all possessing approximately the same dimensions so that they may receive the eyeglasses. The recess for receiving eyeglasses disposed in the rear surfaces of the attachments should of course be of predetermined dimensions to snugly receive the eyeglasses. The eyeglasses may be of any configuration compatible with the frames and may be used by themselves in addition to being used with the frames above described.

The resiliency inherent in a frame member, such as a frame member formed of plastic, may be sufficient to retain portions of a pair of eyeglasses in interlocking engagement without the need for forming locking projections 56 of FIG. 1 and without the need of employing latch members 58. The manner of assembling the eyeglasses and the frame above described is so simple that it may be carried out by touch, and a person normally in need of glasses for seeing objects at a close range may effect the change in a ready manner without the need for visual observation.

It has been noted from the above description that the frame construction is simple in nature, comprising a minimum number of parts. However, when assembled to a pair of eyeglasses the appearance of the eyeglasses is totally changed. The frames provided may be employed for a number of purposes. For instance, as above described, the frames may be employed as sunglasses by the use of ear attachments, in the manner illustrated in FIG. 5. Although totally changing the appearance of a pair of eyeglasses, the frames of this invention comprise an integral assembly which can be attached to eyeglasses in a matter of seconds. The frames may obviously also be worn alone with ear-engaging pieces 66.

The specific appearance of a frame constructed in accordance with the teachings of this invention may, of course, vary greatly. The frame rims, for instance, may have rhinestones embodied therein; frames may, of course, be fabricated of different plastics in various colors, different designs may be formed in various frame components, so as to provide a number of attachments for a pair of eyeglasses which are suitable for particular occasions or particular times of the day. It is apparent, as above pointed out, that the temple-rim hinges may vary in details of construction. For instance, the proximal end portions of the temples may employ end portions similar to illustrated portions 30 in the drawing having inwardly directed projections formed integrally therewith at the illustrated position of the apertures 32. The projections which may assume a conical configuration are then snapped into apertures 24 of member 20 (which need not be tapped). The C-shaped member 20 may also be replaced by members similar to ears 22 formed integrally with rim-endpieces 18. Because of the unique manner of frame-eyeglass assembly the proper disposition of the eyeglass lenses relative to the eyes of the wearer is not disturbed, regardless of whether the eyeglasses are employed alone or with a frame.

It has been made apparent from the foregoing that the invention above described is adapted for a variety of uses and is extremely flexible so that it may serve a number of purposes. It is intended, therefore, that this invention be limited only by the scope of the appended claims.

We claim:
1. In combination, a primary spectacle frame, an auxiliary ornamental frame for said primary spectacle frame comprising spaced rim means, connecting bridge means joining said rim means, opposed end pieces defining the opposed lateral end portions of said spaced rim means, temple means having end portions hingedly connected to said end pieces, recesses in the central portions of the inwardly facing surfaces of said auxiliary ornamental frame bridge and temple means and in the inner surfaces of said auxiliary ornamental frame rim means for reception of comparable component parts of said primary spectacle frame to which said auxiliary ornamental frame is attached, said auxiliary ornamental frame being composed of a resilient material of composition and said auxiliary ornamental frame recesses being of such a size as to receive said comparable component parts of said primary spectacle frame in a snug manner whereby said primary spectacle frame is frictionally retained within said auxiliary ornamental frame recesses, the axes of rotation of the engaged auxiliary ornamental frame and primary spectacle frame temples being collinear when said temples are in the interlocked position whereby each pair of interlocked auxiliary ornamental frame and primary spectacle frame temples may pivot as an integral unit.

2. An auxiliary ornamental frame attachment for a primary spectacle frame, said auxiliary frame having spaced rims, a bridge connecting said rims, and temples hingedly mounted on opposed lateral portions of said rims, lenses for shielding against the rays of the sun mounted in each of said rims, latch means pivotally mounted on distal end portions of said auxiliary ornamental frame temples, each of said latches being of inverted U-shaped cross-sectional configuration having spaced wall portions straddling opposed surface portions of each end portion of said auxiliary ornamental frame temples in the normal latching position, said rims and temples being recessed on their inwardly facing surfaces whereby corresponding lens holder portions and temple portions of a pair of primary spectacle frames may be received within said recesses; each ornamental frame temple-rim hinge comprising spaced hinge portions having collinear axes of rotation between which a temple-rim hinge of such primary spectacle frame may be received for concentric rotation therewith.

3. An ornamental frame comprising spaced rim means joined by an interconnecting bridge means, temple means hingedly mounted to opposed lateral portions of said rim means, lenses for shielding against the rays of the sun mounted in each of said rim means, latch means pivotally mounted on distal end portions of said frame temple means and having an inverted U-shaped cross-sectional configuration and having spaced wall portions straddling opposed surface portions of each end portion of said temple means in the normal latching position; said temple means being recessed on their inwardly facing surfaces, ear-engaging means having a laterally projecting portion defining one end limit thereof, an intermediate portion continuous with said projecting end limit having reduced peripheral dimensions and having a cross section snugly received within said temple means recess and having a length equal to said latch wall which covers the inner-surface of said temple means; and a shoulder portion contiguous with said intermediate portion possessing cross-sectional dimensions too large to be received in said temple means recesses, said ear-engaging means being assembled with the end portions of said temple means whereby said terminal projecting portion and said enlarged contiguous portion of said ear-engaging means spaced therefrom may straddle the inner-wall surface of said latch means in the normal position of assembly and be simultaneously locked to said temple means end portion.

4. An auxiliary ornamental frame for a primary spectacle frame, said primary spectacle frame having spaced lens holder means, bridge means connecting said lens holder means, and temple means hingedly connected to opposed lateral portions of said lens holder means; said auxiliary ornamental frame being adapted to interfit with said primary spectacle frame; said auxiliary ornamental frame comprising spaced rim means, connecting bridge means joining said rim means, and temple means hingedly connected to opposed lateral portions of said rim means; said rim, bridge and temple means of said auxiliary ornamental frame having recesses formed therein whereby comparable components of said primary spectacle frame may be received in said auxiliary ornamental frame recesses and interfit therewith, the axes of rotation of said auxiliary ornamental frame and primary spectacle frame temple means being collinear in the interlocked position whereby said interlocked auxiliary ornamental frame and primary spectacle frame temple means may pivot as a unit; each auxiliary ornamental frame temple-lens holder means hinge comprising two superposed inwardly projecting portions disposed on a terminal end portion of each auxiliary ornamental frame temple means and two spaced ears inwardly projecting from opposed end portions of said lens holder means, said latter ears being receivable between said projecting portions; said auxiliary ornamental frame temple means projecting portions being pivotally mounted on said ears, the temple-lens holder hinge means of said primary spectacle frame being receivable between said auxiliary ornamental frame inwardly projecting ears whereby the auxiliary ornamental frame and primary spectacle frame temple-lens holder hinge connections have collinear axes of rotation.

5. In combination, a primary spectacle frame, an auxiliary ornamental frame in overlying relation with said primary spectacle frame, said auxiliary ornamental frame having spaced rim means, hinge means disposed on each of said rim means, bridge means interconnecting said rim means, and temple means having hinge means disposed at one end portion thereof; said temple means-hinge means engaging said rim means hinge means; all of said auxiliary frame means being recesssed in the inner surfaces thereof for snug reception of comparable components of said primary spectacle frame, the hinge means of both said auxiliary frame rim means and temple means comprising spaced hinge portions pivotally movable about collinear axes of rotation between which a temple-rim means hinge of the primary spectacle frame may be received for concentric rotation therewith when said primary spectacle frame is snugly received in the auxiliary ornamental frame recesses.

6. An auxiliary ornamental frame for a primary spectacle frame, said primary spectacle frame having lens holder means, said lens holder means having hinge means formed on end portions thereof, bridge means connecting said lens holder means, and temple means having hinge means thereon hingedly connected to opposed lateral portions of said lens holder means, said primary spectacle frame interlocking with said auxiliary ornamental frame, said auxiliary ornamental frame comprising spaced rim means having hinge means formed on end portions thereof, an interconnecting bridge means joining said rim means, and temple means having hinge means thereon hingedly connected to opposed portions of said rim means, rear surface portion of said auxiliary ornamental frame having recesses formed therein whereby comparable components of said primary spectacle frame are received in said auxiliary ornamental frame recesses and interlock therewith, the primary spectacle frame temple-lens holder means hinge means having an axis of rotation collinear with that of the auxiliary ornamental frame temple-rim means hinge means.

References Cited in the file of this patent
UNITED STATES PATENTS

| | | |
|---|---|---|
| 775,381 | Newbold | Nov. 22, 1904 |
| 1,440,430 | Wrighton | Jan. 2, 1923 |
| 2,280,354 | Rezos | Apr. 21, 1942 |
| 2,284,630 | Banks | June 2, 1942 |
| 2,379,928 | Rosenheim | July 10, 1945 |
| 2,442,483 | Biasi | June 1, 1948 |
| 2,482,195 | Martin | Sept. 20, 1949 |
| 2,495,508 | Cleaver | Jan. 24, 1950 |
| 2,703,036 | Splaine | Mar. 1, 1955 |

FOREIGN PATENTS

| | | |
|---|---|---|
| 802,302 | France | June 6, 1936 |
| 466,034 | Great Britain | May 20, 1937 |
| 551,160 | Italy | Nov. 16, 1956 |
| 266,411 | Switzerland | Apr. 17, 1950 |